(12) United States Patent
Tews et al.

(10) Patent No.: US 8,192,158 B1
(45) Date of Patent: Jun. 5, 2012

(54) APPARATUS AND METHOD TO INCREASE TOTAL-TO-STATIC PRESSURE RATIO ACROSS A TURBINE

(75) Inventors: Brian E. Tews, Melbourne, FL (US); Christian O. Rodriguez, Palm Bay, FL (US)

(73) Assignee: Mainstream Engineering Corp., Rockledge, FL (US)

( * ) Notice: Subject to any disclaimer, the term of this patent is extended or adjusted under 35 U.S.C. 154(b) by 757 days.

(21) Appl. No.: 12/333,770

(22) Filed: Dec. 12, 2008

(51) Int. Cl.
*F01D 1/00* (2006.01)
*F01D 1/02* (2006.01)

(52) U.S. Cl. ............... 415/220; 415/207; 415/211.2

(58) Field of Classification Search ............ 415/220, 415/207, 211.2
See application file for complete search history.

(56) References Cited

U.S. PATENT DOCUMENTS

| | | | |
|---|---|---|---|
| 3,409,228 A | 11/1968 | Mehr | |
| 3,463,402 A | 8/1969 | Langston, Jr. | |
| 5,067,316 A * | 11/1991 | Bonniot | 60/263 |
| 5,435,127 A | 7/1995 | Luffy et al. | |
| 6,419,448 B1 * | 7/2002 | Owczarek | 415/207 |
| 6,510,683 B1 * | 1/2003 | Lawlor | 60/39.35 |
| 6,792,747 B2 * | 9/2004 | Schierbaum | 60/263 |
| 7,631,483 B2 * | 12/2009 | Mani et al. | 60/226.1 |
| 2005/0060982 A1 * | 3/2005 | Mani et al. | 60/226.1 |
| 2008/0075580 A1 * | 3/2008 | Yanagi et al. | 415/119 |
| 2008/0175703 A1 * | 7/2008 | Lugg | 415/66 |
| 2008/0315042 A1 * | 12/2008 | Evulet et al. | 244/53 B |
| 2009/0014597 A1 * | 1/2009 | Chase et al. | 244/53 B |
| 2011/0062290 A1 * | 3/2011 | Chase et al. | 244/53 B |

* cited by examiner

*Primary Examiner* — Nitin Parekh (57) ABSTRACT

A method for increasing the total-to-static pressure ratio across a Ram Air Turbine (RAT) has designed and experimentally tested. The invention develops a localized accelerated flow of free-stream air near the discharge of the turbine rotor exhaust. This localized accelerated flow decreases the static pressure at the exit of the turbine and allows for additional power generation for a given free-stream flight condition. Full-scale wind tunnel experimenting testing shows that creating this low static pressure region behind the turbine resulted in significant increases in turbine output power when compared to a turbine that is not subjected to this invention. The invention showed the ability to increase the total-to-static pressure ratio across the turbine.

15 Claims, 10 Drawing Sheets

APPARATUS AND METHOD TO INCREASE TOTAL-TO-STATIC PRESSURE RATIO ACROSS A TURBINE

GOVERNMENT LICENSE RIGHTS

The U.S. Government has a paid-up license in this invention and the right in limited circumstances to require the patent owner to license others on reasonable terms as may be provided for by the terms of Contract No. N68335-06-C-0086 awarded by the Department of Navy.

BACKGROUND OF THE INVENTION

1. Field of the Invention

The present invention relates to air driven power generators, particularly to power generation, size, weight, and efficiency improvements of ram-air driven turbines and the like. An aerodynamic low-pressure exhaust ducting mounted on the discharge side of an air-driven turbine has been developed. The invention generates an increased ratio of total-to-static pressure across a Ram Air Turbine (RAT) developed for a combined Ram air Power and Cooling unit (RPC), resulting in increased turbine power generation when compared to a conventional RAT. Improvements in the ram-air turbine design and the functionality of the turbine exhaust ducting provide increased power extraction capability resulting in a smaller and lighter power generator that minimizes the overall system size and weight.

2. Description of the Related Art

A RAT is a turbine driven by free-stream air that flows past an aircraft during flight. RATs can be used to develop mechanical power that can be directly converted into electrical power using a generator, or both. The mechanical shaft power can be used to power any mechanical device, including but not limited to hydraulic systems, vapor-compression cooling system compressors, circulation pumps, or refueling pumps. Electrical power can be used for electronic subsystems, such as onboard avionics equipment, electronic warfare equipment, and auxiliary backup power systems. RATs can be mounted directly onboard an aircraft fuselage or on secondary wing mounted pods or stores. At wing-mounted locations, the RAT can be located either at an external location where the turbine is directly exposed to free-stream air, or an internal location inside a pod, where the free-stream air is ducted to the turbine through an inlet that is exposed to free-stream air. Prior work on internal RAT's have utilized ducts to deliver free-stream air to the turbine. By locating the RAT internally, however, pressure losses occur in the inlet ducting, which decreases turbine output power. Such internal RAT arrangements are also limited to ambient static pressure on the turbine discharge. The present invention makes it more feasible to locate a RAT in an interior location and extract additional power relative to a conventional RAT.

U.S. Pat. No. 3,463,402 (Langston), teaches the use of an ejecting exhaust nozzle to generate turbulence between two streams of gas, thus suppressing the noise normally generated from shear stresses at the interface of the higher velocity core gas stream with the lower velocity gas stream in a gas turbine engine. U.S. Pat. No. 3,409,228 (Mehr) teaches an ejector nozzle for cooling a gas turbine engine and exhaust nozzle, whereby an ejector is in flow communication with an engine inlet and its purpose is to draw additional ram airflow through a bypass duct to provide cooling to the engine and exhaust nozzle. U.S. Pat. No. 5,435,127 (Luffy) also teaches the use of an ejector nozzle to provide cooling airflow to components of a gas turbine engine; however, this system requires an additional boost pump. None of the prior art teaches the use of a converging/diverging ram air ejector nozzles to increase the total-to-static pressure ratio across a ram air driven turbine for the purpose of increasing power.

The mechanical power that can be developed from a RAT is a function of the total-to-static pressure ratio across the turbine rotor. The pressure at the face of the turbine rotor is a function of the aircraft velocity, altitude, and environmental conditions and is specified as the total pressure or the maximum obtainable pressure that can be utilized for power generation. If a method to decrease the static pressure is not utilized, the power generating capability of the RAT is limited to the total pressure developed by the aircraft and the ambient static pressure.G

SUMMARY OF THE INVENTION

The present invention relates to any fluid-driven turbine for producing shaft work and electric power generation. When electric power is required, the RAT and alternator are designed as an integrated unit, and the alternator is the only driven mechanism of the turbine. An axial turbine is used for demonstration purposes, although it will be apparent to anyone skilled in the art in view of the disclosure herein that the present invention also applies to radial, impulse, reaction, and other types of turbines.

Therefore, in light of the benefits of an enhanced RAT driven integrated, lightweight, generator, as well as, the aforementioned shortcomings in the prior art, the present invention has, among other things, the following objectives and advantages:

An increase in the total-to-static pressure ratio across a turbine resulting in increased power extraction, rotational speed, efficiency, and reduced size and weight.

An improved ram-air driven power generating unit that utilizes existing lightweight materials, such as metals, composites, or polymers.

An Ability to integrate the generator alternator onto the turbine shaft to eliminate excessive components, such as couplings and reduce weight. The alternator increases shaft inertia, which reduces speed fluctuations, and generates electrical power.

BRIEF DESCRIPTION OF THE DRAWINGS

Other objects, advantages and novel features of the present invention will become apparent from the following detailed description when considered in conjunction with the accompanying drawings herein.

FIG. 4b is a top view of another embodiment of compression wall having a different geometry from that of FIG. 4a.

DETAILED DESCRIPTION OF THE INVENTION

The present invention relates, in particular, to air-driven turbine, power generation equipment. This invention is, however, not limited to air but can be used with any incompressible or compressible working fluid. This invention is also not limited to aircraft, but may be used with automobiles, submarines, towed body arrays, hydroelectric dams, and other embodiments that may benefit from improved energy transfer.

For systems requiring electrical power, the air-driven turbine and the alternator are designed as an integrated unit. The turbine may also have other driven mechanisms such as hydraulic systems (pumps, actuators, etc.) and compressors for cooling that are driven either solely or in tandem with the electric generator. The figures provided in the detailed description show an axial-flow turbine, although radial, impulse, reaction, and other types of turbines can be used as well. The following terms are defined to assist with the description of the invention as used the context of the present invention.

An air-driven turbine is a device that generates mechanical power through the expansion of air or other working fluid through a turbine rotor.

An alternator is a device that converts mechanical power into electrical power through the use of electromagnetic fields. Permanent magnet alternators are a type of alternator wherein the magnetic field is generated by permanent magnets.

An exhaust duct is a generic term given to the mechanism for exhausting the working fluid from the turbine into the atmosphere. In the context of the present invention, the exhaust ducting is comprised of one or more components and provides multiple functions.

An exhaust compression wall is a term given to an aerodynamic geometric mechanism that enhances the turbine exhaust process. In the context of the present invention, the compression walls are comprised of one or more components and provide multiple functions to decrease the static pressure on the discharge side of a turbine.

An electric generator (or generator) is a generic term for a device that creates electrical power. In the context of the present invention, an electric generator is a machine comprised of the RAT and the alternator combined, with or without other devices attached to the power-producing shaft as well.

A serpentine inlet duct is a term given to a mechanism that directs free-stream air or other working fluid from a high-pressure or high-velocity source to the turbine inlet. The current embodiment is not limited to using a serpentine inlet, other geometries can be utilized such as flush mounted ducts, body blended, or other geometries that deliver free-stream air to the turbine.

Figure 1A:
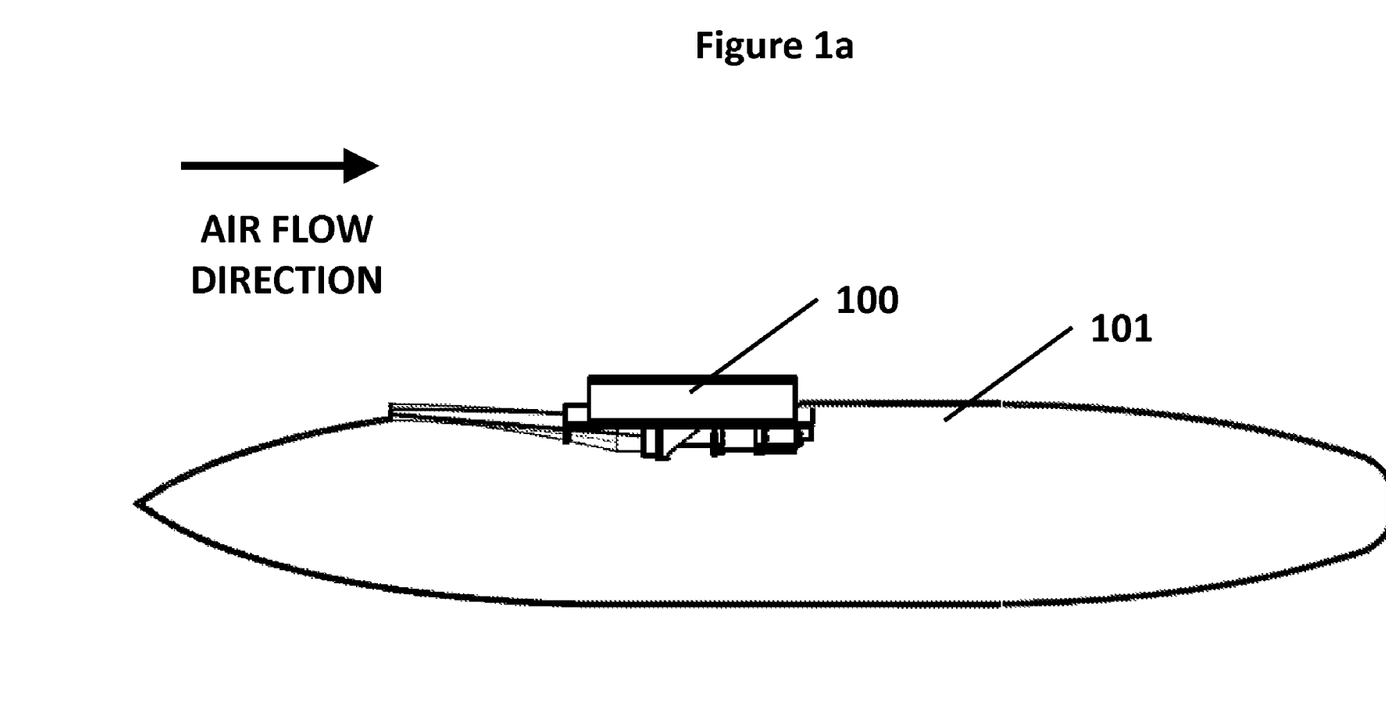
FIG. 1a is a side view of a complete internal air-driven turbine and generator unit mounted inside of a 480-gallon fuel pod.
Figure 1B:
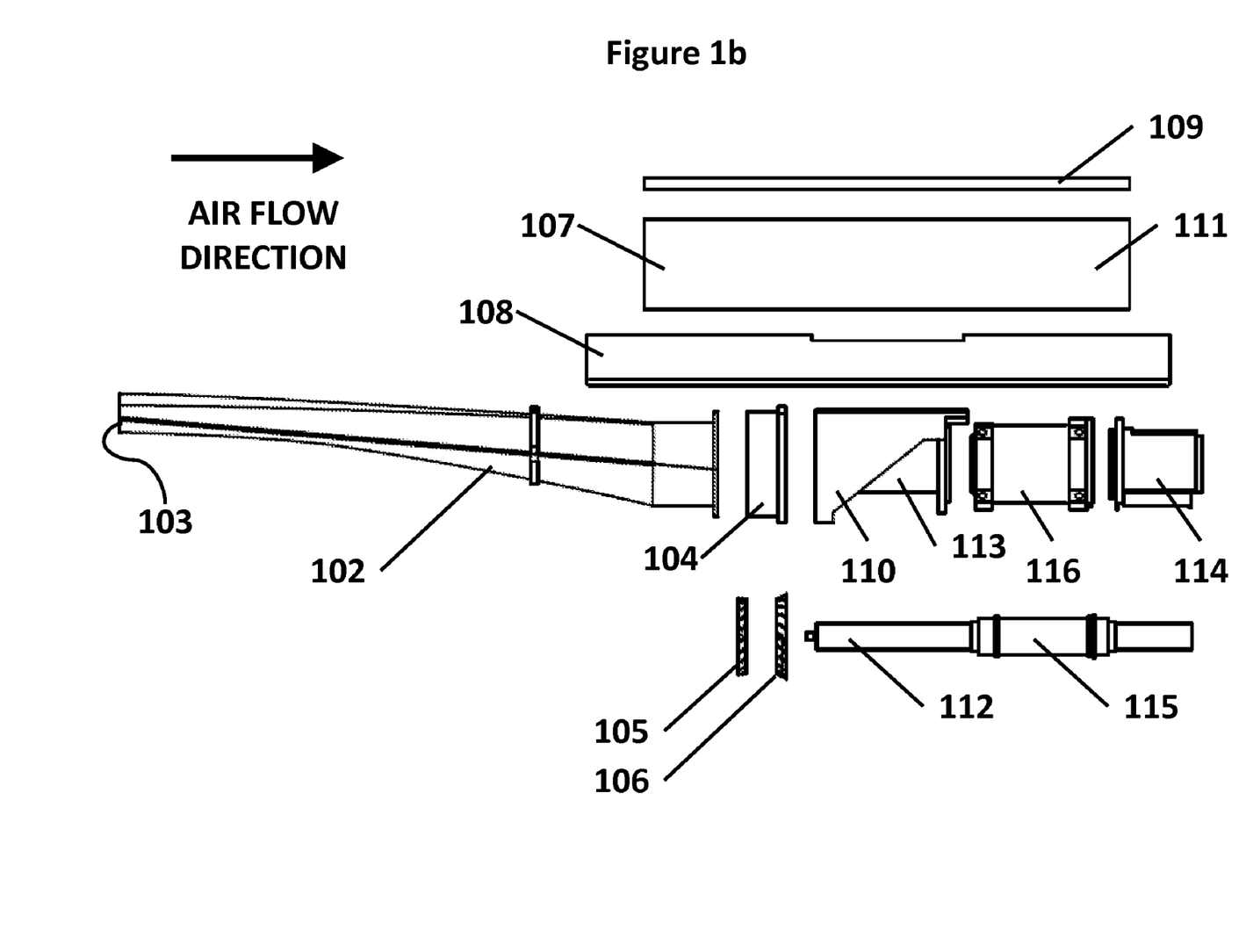
FIG. 1b is an exploded side view of the current embodiment of the ram-air driven electrical generator shown in FIG. 1a in accordance with the present invention.

FIG. 1a is an assembly side view of an internal air-driven turbine power unit 100 located inside a fuel pod 101. FIG. 1b is an exploded side view of the internal air-driven turbine power unit components without the pod. Referring to FIG. 1b, a serpentine inlet duct 102 is used to direct free-stream air to the turbine. Air enters the inlet 103 of the duct 102 and flows through to the turbine stator and diffuser housing 104. Mounted inside of the turbine stator housing is the turbine stator 105 shown in the lower view. The air flows through the stationary stator 105 and imparts a tangential velocity component to the fluid; the air exits the turbine stator 105 and flows through the turbine rotor 106 which is located directly behind the turbine stator 105. As the air imparts kinetic energy to the turbine rotor 106, the air pressure decreases prior to entering the diffuser section of the turbine stator housing 104. The diffuser expands air to reduce the static pressure on the discharge side of the turbine rotor 106. At the same time as the air exits into the turbine diffuser, free stream air flows through a passage comprised of a pair of compression walls 107 (only one of which is seen), mounting plate 108, and cover plate 109 located at the exit of the turbine exhaust duct 110. The passage formed by the compression walls 107, mounting plate 108, and cover plate 109 is configured to capture free-stream air and accelerate it relative to the free stream air. This local acceleration of free stream air creates a lower static pressure region at the turbine discharge which increases the total-to-static pressure ratio across the turbine. This increased pressure ratio allows the turbine to extract additional power relative to a turbine that does not have compression wall located at the turbine discharge. The air that exits from the diffuser combines with the high-velocity low static pressure region in the exhaust duct 110, and the air is then rejected out of the air-driven turbine system to the ambient atmosphere 111.

The turbine rotor is mounted on a shaft 112 that is supported by two or more bearings 113, of the rolling element, journal, magnet, or foil type. Angular contact bearings are typically used for high-speed machines but require precise tolerances while providing support in both the axial and radial directions. Mounted on the shaft are rare-earth permanent magnets 115 fabricated from Samarium Cobalt, Neodymium Iron Boron or other suitable magnet material that would be known to one well skilled in the art. In the current embodiment, Samarium Cobalt permanent magnets were utilized due to their stable flux density throughout the operating temperature range. In a narrower temperature range, other permanent magnet materials could provide greater flux density, and therefore a smaller alternator size. The shaft 112 rotates the magnets 115 around (inside or outside) a stationary wire-wound stator core 116 forming a permanent magnet alternator. The preferred alternator type is a permanent magnet alternator; however, any type of mechanical to electrical conversion device could be substituted. Permanent magnet alternators are the simplest, most efficient, and most reliable type of alternator. Because they utilize permanent magnets instead of electro-magnets, there are no brushes, slip rings, or rotating fields, thereby eliminating wear components and reducing electro-magnetic interference emission. Permanent magnet alternators are typically classified as either axial gap or radial gap, referring the orientation of the airgap between the rotor and stator relative to the axis of rotation. Axial gap (also known as pancake or disc-type) alternators have the advantage of low cost and ease of manufacture. Axial gap alternators can be made with a relatively small radial dimension. Radial gap permanent magnet alternators can have either an interior or exterior rotor. Any of these configurations can be used with the present invention.

The compression walls 107 that enable the development of localized accelerated flow are configured and arranged to optimize the low-pressure region behind the turbine and increase power extraction from the free-stream air.

Figure 2A:
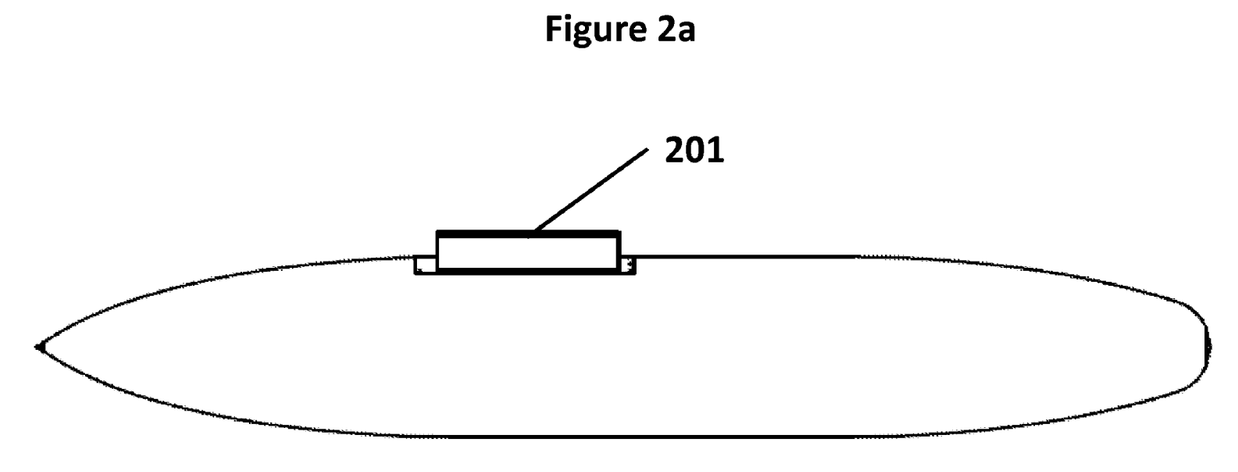
FIG. 2 is a side view of the exhaust ducting compression walls mounted on a pod, the walls being mountable on the exterior or interior of the pods overall profile of the ram-air driven electrical generator.
Figure 2B:
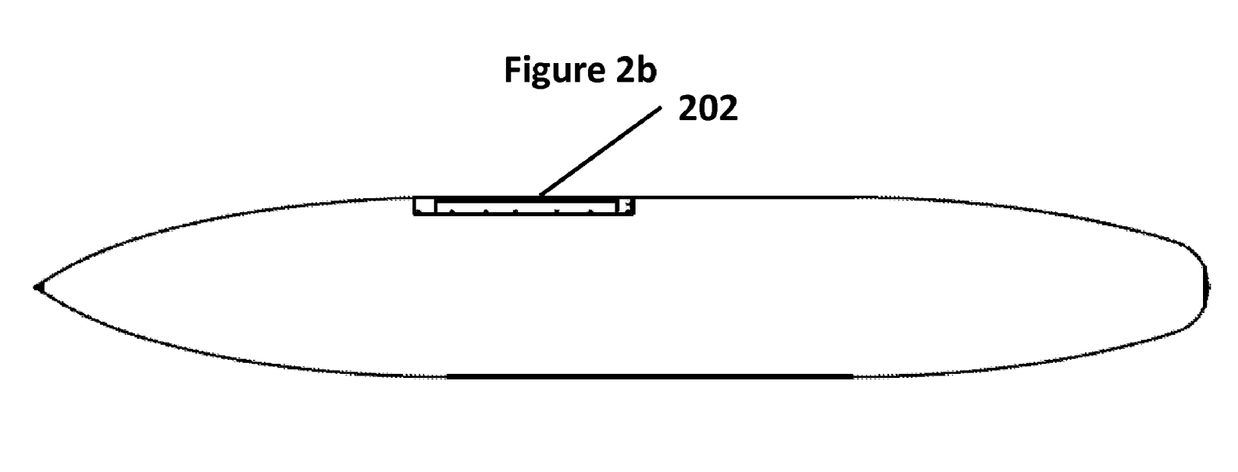

As shown in the embodiment of FIG. 2a, the passage formed by the compression walls 107, mounting plate 108, and cover plate 109 comprising the pressure ratio increasing system 201 are mounted at the exterior of a pod of the type shown in FIG. 1a. The current system is not, of course, limited to pods. Additional locations include exterior fuel tanks, aircraft fuselages, and other aerodynamic bodies that require power generation using free-stream air or other working fluid. The current embodiment is not limited to being located on the exterior surface of an aerodynamic pod. As shown in the FIG. 2b embodiment, additional locations of the compression walls can be blended into the aerodynamic body 202 and free-stream air redirected to this location to achieve the same results. The current embodiment is not limited be mounted on the top of the pod, the invention may be mounted in any configuration that benefits the performance of the system.

Figure 3:
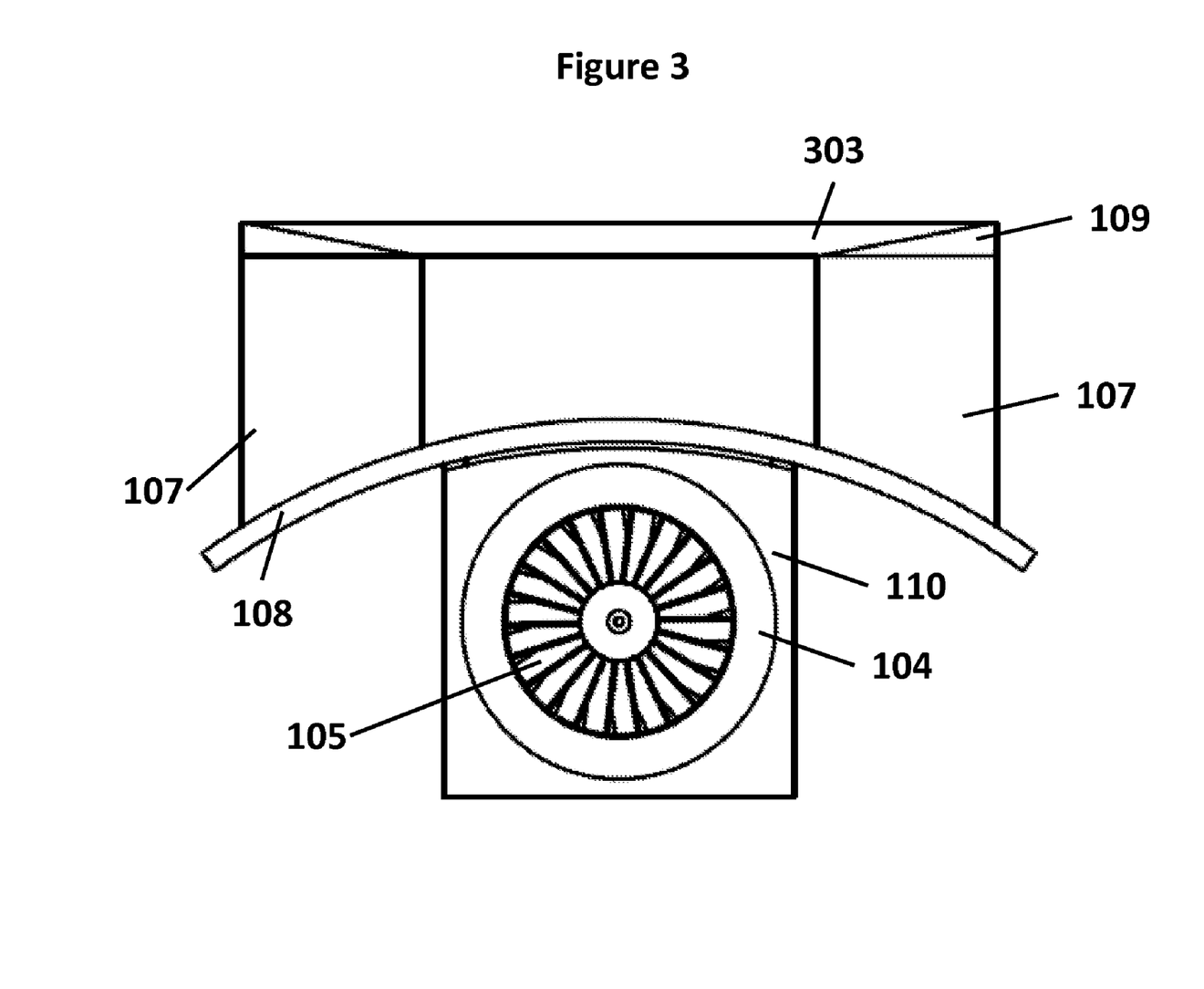
FIG. 3 is a front view of a turbine exhaust with compression walls and top of the ram-air driven electrical generator in accordance with the present invention.

FIG. 3 shows a front view of the unit without the serpentine inlet duct 102. For the current embodiment, two compressions walls 107 are utilized, one on each side of the turbine exhaust duct 110. However, additional compression walls can be designed into the system for performance increases. In place of individual separate compression walls, a unit can also be fabricated as a single component.

In one embodiment, each wall 107 is mounted to a plate 108 for attachment, as shown in FIG. 3. The compression walls 107 can be mounted to secondary structure if necessary.

For the current embodiment, a cover plate 109 spans across the top of the two compression walls 107 to prevent air from escaping between the compression walls as shown in FIG. 3. The current embodiment is not limited to using a cover plate, and exhaust performance can be modified without a cover plate if necessary.

The cover plate 109 may also have an angled aerodynamic feature 303 that directs free-stream air into the exhaust ducting, this aerodynamic surface can be either straight, curved, or have other geometric variations to achieve optimal design.

As shown in FIG. 3, the mounting plate 108 of the ducting can have an arced shaped profile matching the outer profile of the pod. This surface can be varied to accommodate various profiles, such as a flat surface, arced surface, or other geometric shape to modify the conditions in the exhaust ducting.

Figure 4A:
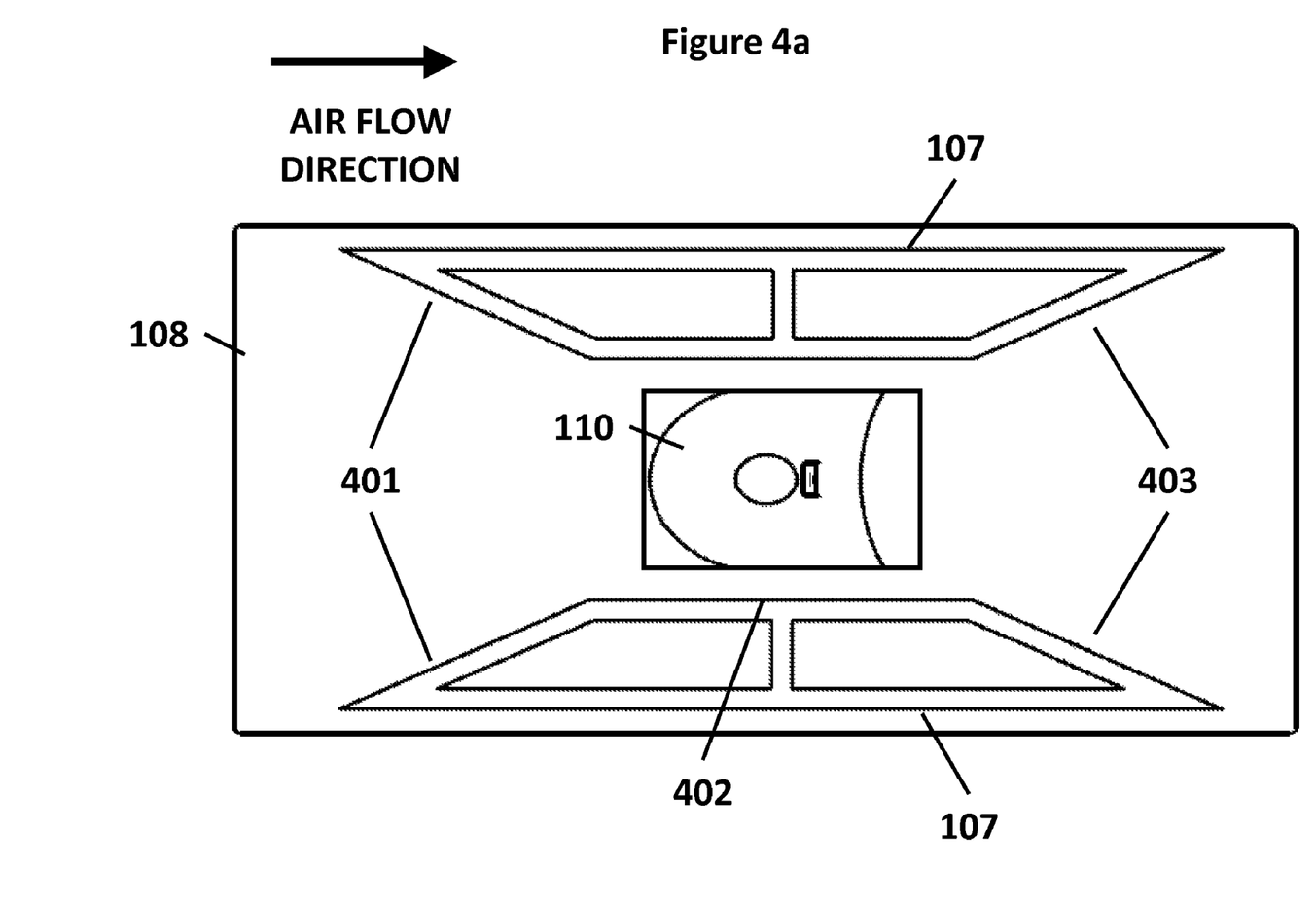
FIG. 4a is a top view of the compression walls, mounting plate and exhaust ducting for the ram-air driven electrical generator.
Figure 4B:
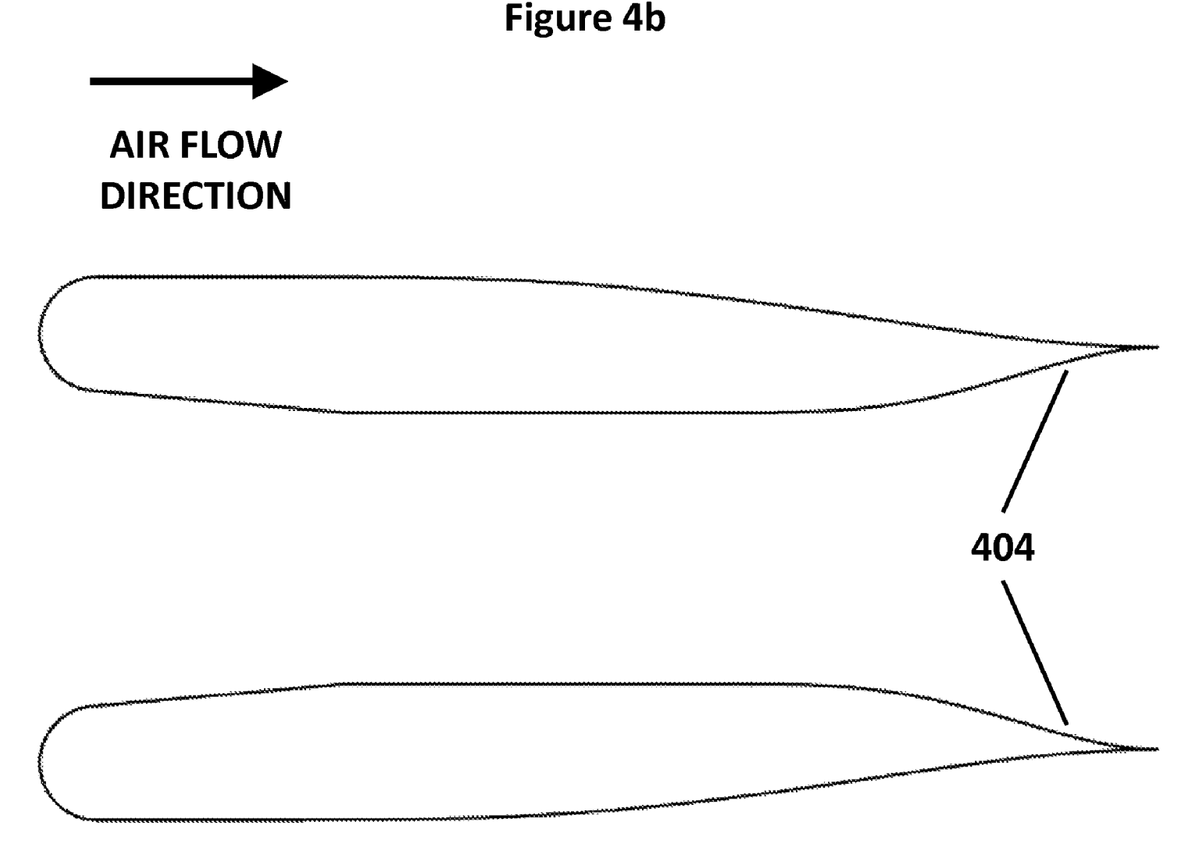

FIG. 4a show a top view of the compression walls 107, turbine exhaust duct 110, and mounting plate 108. Each compression wall 107 has an angled surface 401 to redirect the flow to a constant area section 402 at the turbine exhaust duct. The air in the passage formed by the compression walls 107, mounting plate 108, and cover plate 109 combines with the air exiting the turbine exhaust, and flows through an angled surfaces 403 at the discharge of the unit. The current system is not limited to straight angled walls. Referring to FIG. 4b, walls with curved surfaces 404 or other geometric variations can replace the straight angled surfaces for performance modification.

Referring to FIG. 4a, each compression wall 107 is designed to direct free-stream air toward a constant area section 402 surrounding the exhaust duct 110. This redirection of the air in the converging section of the compression walls accelerates the flow. The current embodiment is not limited to a constant area section and can be replaced with other geometric configurations to change the performance of the turbine exhaust ducting.

Referring to FIG. 4a, the location of the compression walls 107 can be varied with respect to the exhaust ducting 110 to modify performance. Examples include moving the walls forward or aft ward relative to the turbine exhaust, the distance between the walls can also modify the performance of the system. Changes in the constant area section by increasing or decreasing the height of system may also be considered to modify the performance of the system.

The current embodiment was fabricated from aluminum, but the current embodiment can be fabricated from any material, preferably a lightweight material such as light alloys, ceramics, carbon fiber, and polymers.

The present invention is not limited to Ram Air Turbines, but may be utilized on other power generation system that can benefit with lower static pressures at a discharge point.

The location of the power generation system is not limited to a location internal to the pod. The system can be mounted external to the pod or lowered from inside the pod to an external location where the turbine is directly exposed to free-stream air. A cowling or other geometric device can still be mounted on the exhaust side of the turbine to increase the total-to-static pressure ratio.

The current system is not limited to converting mechanical power to electrical power; the mechanical power can be utilized to run hydraulic pumps, aircraft refueling pumps, aircraft refueling pods, cooling compressors, and cooling pumps and additional apparatuses that require mechanical or electrical power for operation.

Experimental testing has been performed utilizing the current embodiment. The experimental testing was conducted in a 7.75° high, 11.04° wide wind tunnel.

The current embodiment was mounted in a 480-gallon external fuel tank to simulate an avionics pod.

A serpentine inlet was used to capture free-stream air and duct it toward an axial turbine.

The embodiment was tested with and without the use of the exhaust compression walls.

Turbine power was measured by electrically loading the permanent magnet alternator using a resistive load bank. The resistive loads were varied in increments to determine the maximum power of the system.

Wind tunnel speeds were varied from 100 mph to 200 mph in 25 mph increments. These values are given by way of example and to demonstrate that benefits are measurable even at low air speeds. The test results are not meant to limit the invention. The present invention has application in subsonic, transonic, supersonic, and hypersonic compressible or incompressible flows.

Two geometric configurations were tested. One experiment was conducted with no exhaust compression walls mounted to the exhaust ducting and is considered a baseline configuration. The second configuration utilized compression walls on the turbine exhaust ducting.

Figure 5:
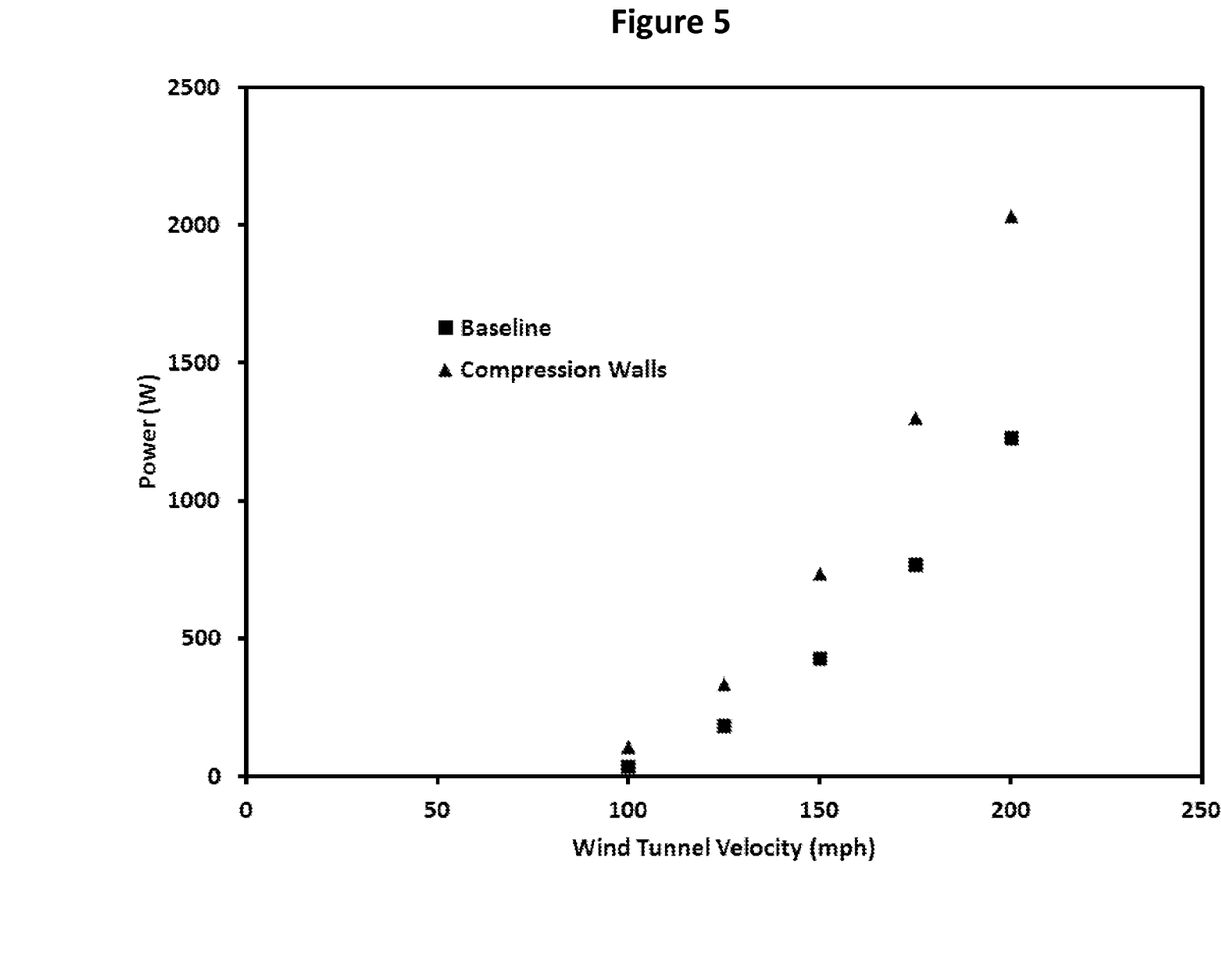
FIG. 5 shows experimental results for turbine power generation with and without the present invention.

FIG. 5 is a plot of power versus wind tunnel velocity for both the baseline configuration and the configuration using the present invention. The figure shows that the average power output of a RAT with compression walls at the exit duct produces at least 65.8% more power than the same RAT, which does not utilize compression walls.

Table 1 shows the experimental power output data for each wind tunnel speed.

TABLE 1

RAT Power Output

| Wind Tunnel Air Speed (MPH) | Baseline Output Power (W) | Compression Wall Output Power (W) | Percent Increase (%) |
|---|---|---|---|
| 100 | 36.64 | 107.83 | 193.0 |
| 125 | 183.72 | 334.54 | 82.0 |
| 150 | 428.27 | 735.15 | 71.6 |

TABLE 1-continued

RAT Power Output

| Wind Tunnel Air Speed (MPH) | Baseline Output Power (W) | Compression Wall Output Power (W) | Percent Increase (%) |
|---|---|---|---|
| 175 | 767.73 | 1299.90 | 69.3 |
| 200 | 1227.28 | 2035.25 | 65.8 |

Figure 6:
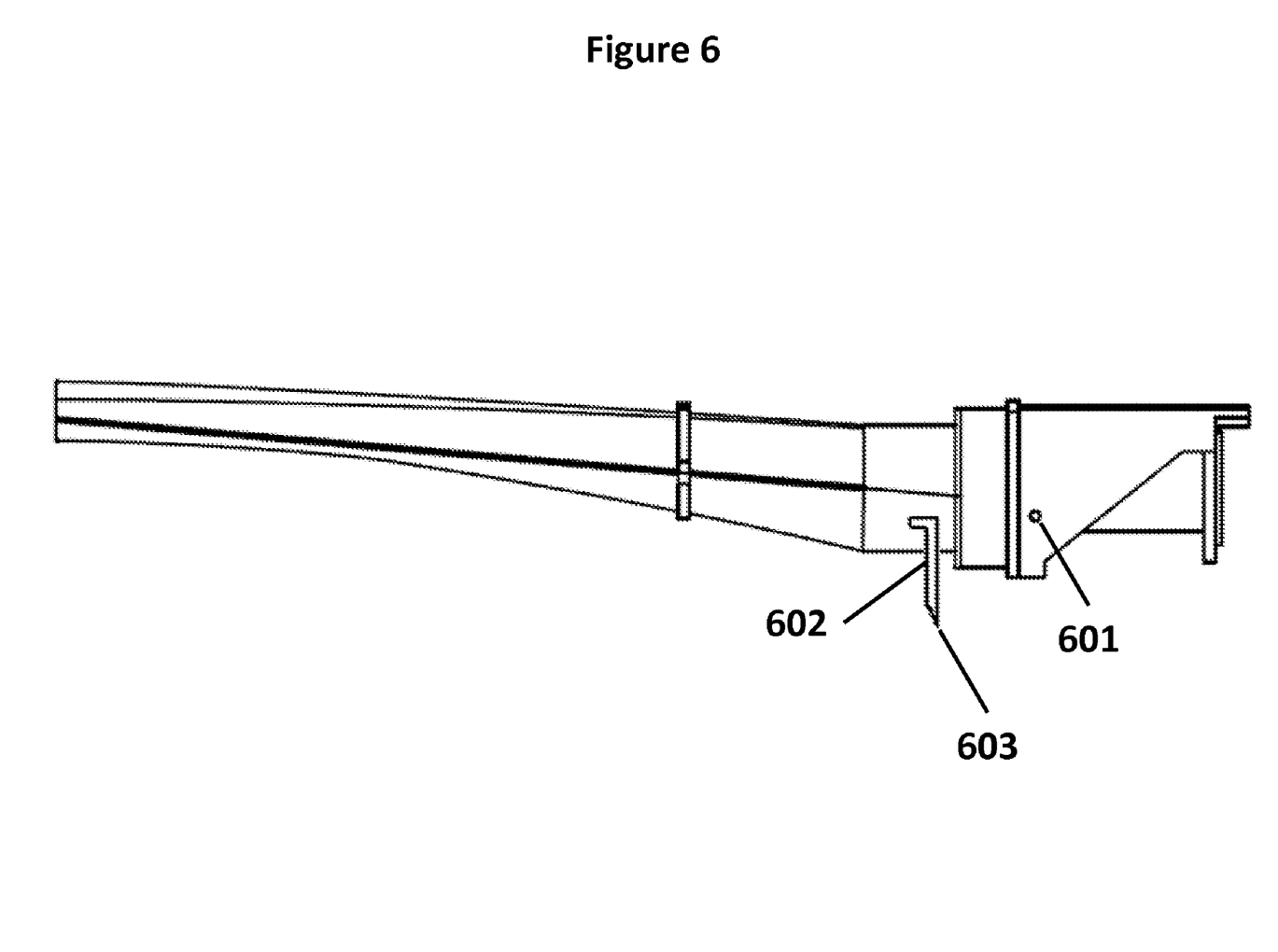
FIG. 6 is a side view of the inlet and exhaust ducting and experimental pressure tap locations.

FIG. 6 shows the inlet and exhaust ducting. Turbine discharge static pressure was measured with a static pressure tap 601. A pitot tube 602 was mounted in the inlet before the turbine stator to record total pressure 603. On the exterior of the 480-gallon drop tank, a pitot tube 203 was mounted to measure free-stream static pressure 204.

Figure 7:
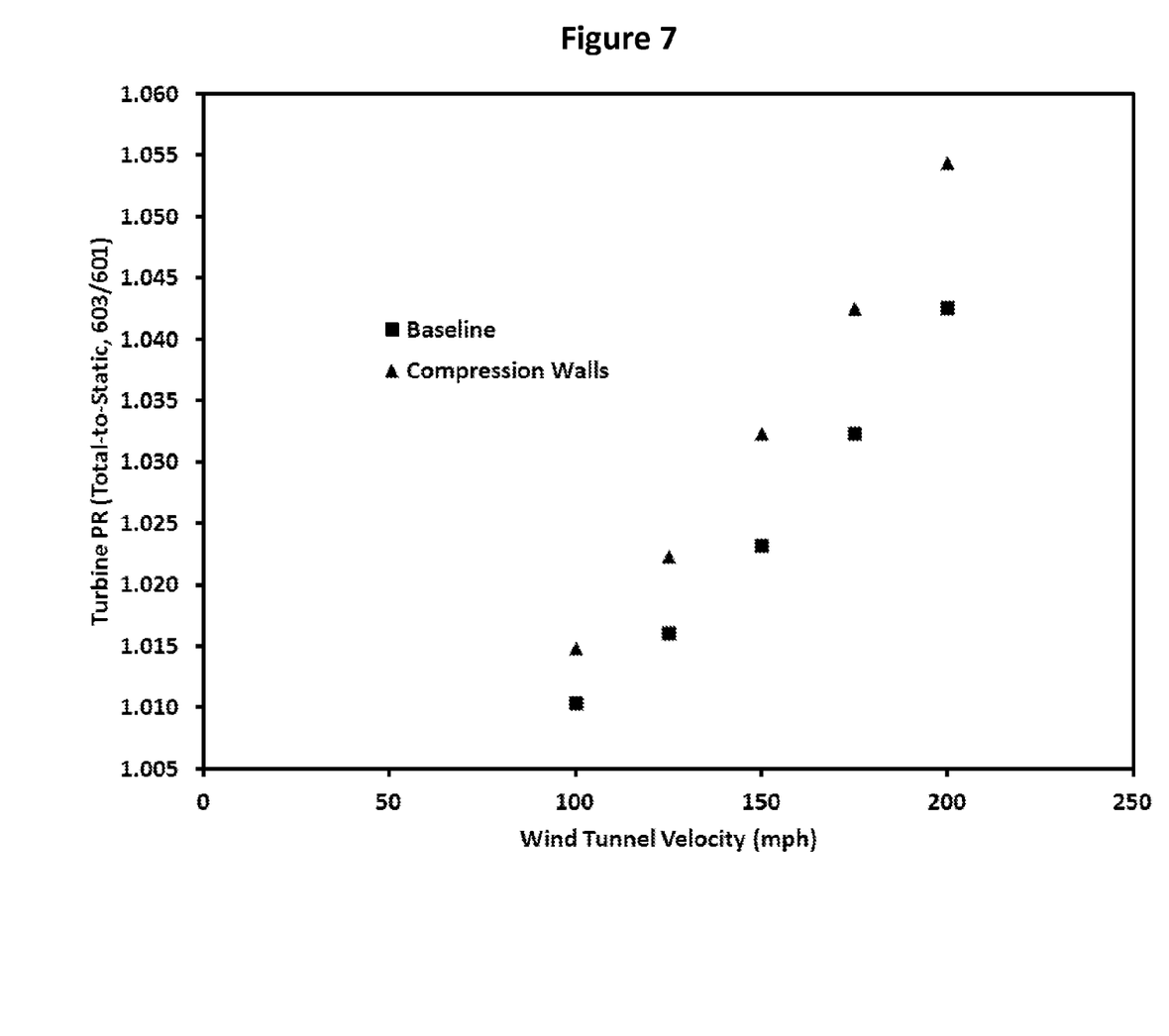
FIG. 7 shows experimental results of the total-to-static pressure ratio across a RAT with and without the present invention.

FIG. 7 shows a comparison of the total-to-static pressure ratio across the turbine between for the baseline exhaust configuration with no compression walls and the exhaust configuration with mounted compression walls.

By utilizing the compression walls on the turbine exit, the total-to-static pressure was increased relative to the baseline configuration.

Figure 8:
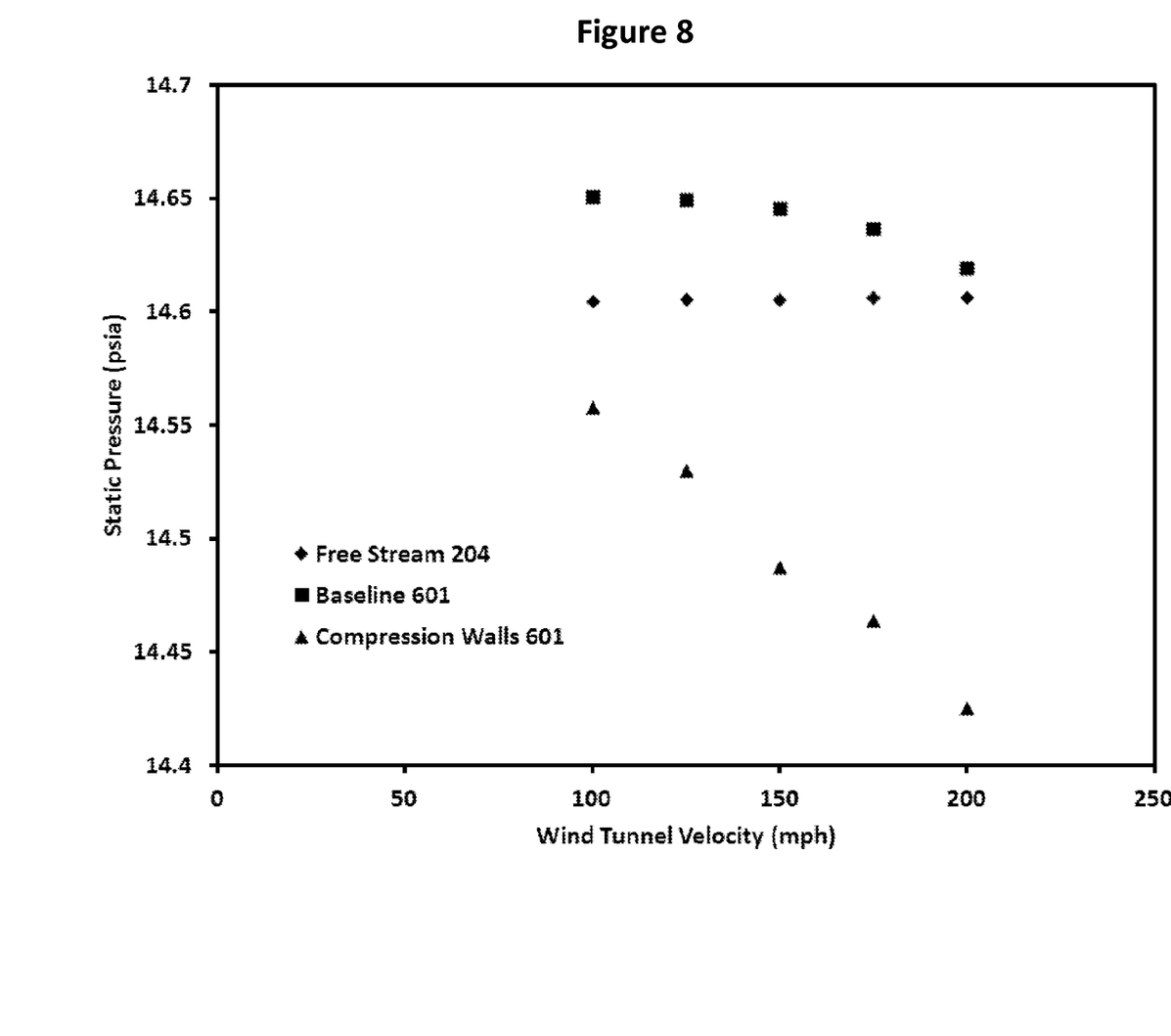
FIG. 8 shows experimental results of the turbine static pressure for a RAT with and without the present invention.

FIG. 8 shows a comparison between the static pressure measured at 601 at the turbine discharge for the exhaust baseline configuration to an exhaust with mounted compression walls. The measured free-stream static pressure is also plotted in the graph.

From FIG. 8, it can be seen that the baseline configuration exhaust ducting that the actual static pressure at the turbine discharge is higher than the free-stream static pressure. This result is expected due to the pressure drop along the length of the exhaust ducting. The data shows that the use of the compression walls lowers the static pressure on the discharge side of the turbine relative to both the free-stream static pressure and the baseline exhaust configuration.

We claim:

1. A system for producing shaft work, comprising
a turbine unit configured to produce a first stream of working fluid flow whose static pressure at an inlet side of the turbine unit is reduced by a first amount at a discharge side of the turbine unit; and
a compression wall arrangement configured to capture and accelerate a free flow fluid stream separate from the first stream to produce at the discharge side of the turbine unit a turbine static pressure region wherein the static pressure at the discharge side is made lower than the first amount of the static pressure produced by the turbine unit alone, whereby an increased total-to-static pressure ratio occurs between the inlet and discharge sides of the turbine unit.

2. The system of claim 1, wherein the turbine unit is one of axial turbine, a radial turbine, an impulse turbine and a reaction turbine.

3. The system of claim 2, wherein a working fluid of the turbine unit is one of compressible and incompressible working fluid.

4. The system of claim 1, wherein the compression wall arrangement is operatively mounted one of exteriorly and interiorly of an associated aerodynamic body at which the turbine unit is arranged.

5. The system of claim 1, wherein the compression wall arrangement includes two compression walls, with one of the walls located on each side of an exhaust duct of the turbine unit.

6. The system of claim 5, wherein the compression wall arrangement includes a cover plate arranged to prevent fluid from escaping between the compression walls.

7. The system of claim 5, wherein the compression wall arrangement includes a cover plate having an aerodynamic configuration arranged to direct free-stream fluid into the turbine unit exhaust duct.

8. The system of claim 1, wherein the compression wall arrangement comprises at least one compression wall having an angled surface to direct flow of fluid to a constant section area at an exhaust duct of the turbine unit.

9. The system of claim 8, wherein the angled surface is one of a straight surface and a curved surface.

10. The system of claim 1, wherein the compression wall arrangement comprises two compression walls arranged to form a passage there between and to combine with fluid exiting with exhaust of the turbine unit, with the combined flow being discharged over angled surfaces at a discharge end of the compression wall arrangement.

11. The system of claim 1, wherein a permanent magnet alternator is integrally associated with a shaft of the turbine unit.

12. The system of claim 1, wherein a hydraulic pump is integrally associated with a shaft of the turbine unit.

13. The system of claim 12, wherein the hydraulic pump is a fuel pump.

14. The system of claim 1, wherein a refrigeration compressor is integrally associated with a shaft of the turbine unit.

15. The system of claim 1, wherein a coolant pump is integrally associated with the shaft of the turbine unit.

* * * * *